(12) United States Patent
Hockly (10) Patent No.: US 11,713,004 B2
(45) Date of Patent: Aug. 1, 2023

(54) ATTACHMENT SOLUTION FOR ATTACHING A VISUAL MEDIA DISPLAY TO A VEHICLE

(71) Applicant: Bevan Hockly, Wellington (NZ)

(72) Inventor: Bevan Hockly, Wellington (NZ)

(*) Notice: Subject to any disclaimer, the term of this patent is extended or adjusted under 35 U.S.C. 154(b) by 58 days.

(21) Appl. No.: 17/398,918

(22) Filed: Aug. 10, 2021

(65) Prior Publication Data

US 2022/0048440 A1 Feb. 17, 2022

(51) Int. Cl.
*G09F 21/04* (2006.01)
*B60R 11/02* (2006.01)
*G09F 9/30* (2006.01)
*B60R 11/00* (2006.01)

(52) U.S. Cl.
CPC ............ *B60R 11/0235* (2013.01); *G09F 9/30* (2013.01); *G09F 21/048* (2013.01); *B60R 2011/004* (2013.01); *B60R 2011/0063* (2013.01)

(58) Field of Classification Search
CPC ........... B60R 11/0235; B60R 2011/004; B60R 2011/0063; G09F 9/30; G09F 21/048
See application file for complete search history.

(56) References Cited

U.S. PATENT DOCUMENTS

| | | | | |
|---|---|---|---|---|
| 3,826,026 A * | 7/1974 | Bevan | ........................ | G09F 7/04 40/644 |
| 7,083,211 B1 * | 8/2006 | Bores | ...................... | G09F 21/04 40/594 |
| 2007/0132664 A1 | 6/2007 | Weissman | | |
| 2008/0123359 A1 * | 5/2008 | Larochelle | ............... | B60Q 1/50 362/501 |
| 2014/0043156 A1 * | 2/2014 | Howk, Jr. | ................ | B60Q 1/50 340/468 |
| 2015/0043231 A1 * | 2/2015 | Clark | ....................... | B60Q 1/50 362/485 |
| 2016/0257259 A1 | 9/2016 | Perry | | |
| 2017/0132960 A1 | 5/2017 | Pinero et al. | | |
| 2017/0331076 A1 * | 11/2017 | Misono | ................. | G02F 1/1333 |
| 2018/0350280 A1 * | 12/2018 | Poole | .................... | G09F 21/048 |
| 2019/0156714 A1 * | 5/2019 | Isgar | ...................... | G08G 1/093 |
| 2019/0172094 A1 * | 6/2019 | Murray | ................. | G09F 21/048 |
| 2019/0213931 A1 * | 7/2019 | Brubaker | ................ | B60Q 1/44 |
| 2020/0143423 A1 * | 5/2020 | Otsuka | .............. | G06Q 30/0266 |
| 2020/0404465 A1 * | 12/2020 | Manicka | ............... | G09F 21/048 |
| 2021/0158728 A1 * | 5/2021 | Castillo | ................ | G09F 13/005 |

FOREIGN PATENT DOCUMENTS

WO WO2017180900 10/2017

* cited by examiner

*Primary Examiner* — Gary C Hoge
(74) *Attorney, Agent, or Firm* — Eric Karich; Karich & Associates (57) ABSTRACT

An attachment apparatus for attaching an electronic media display unit to a vehicle has a containing arrangement that goes over a portion or a whole of the electronic media display unit, and an adhesive arrangement to facilitate adhering the attachment apparatus, and thus facilitate attaching the electronic media display unit to an outside of the vehicle. A portion or a whole of the adhesive arrangement adheres to the outside of the vehicle, outside a portion or a whole of a perimeter of the electronic media display unit, to facilitate attachment.

1 Claim, 3 Drawing Sheets

ATTACHMENT SOLUTION FOR ATTACHING A VISUAL MEDIA DISPLAY TO A VEHICLE

The present invention relates to an attachment solution for attaching an electronic visual media display unit to a vehicle.

Terms/Definitions

'Arrangement':

The term arrangement is a technical term which means a feature, or combination of features, (usually with a given purpose). For example, a 'measuring arrangement' is a feature or features, to facilitate measuring. A 'holding arrangement' is a feature or features, to facilitate holding.

'Feature':

The term 'feature' is a broad term that includes within its scope any feature under the Sun. A feature may, for example, be an element, body, member, or may even be an aperture (eg opening/hole/gap or the such like). Thus the term 'holding feature' includes within its scope, for example, any element, body, member, or even aperture, to facilitate holding. A 'feature' may also be a 'part' of a broader feature; for example, if a part of an invention is disclosed/claimed as comprising a 'padding feature', this does not limit the padding feature to being a separate feature that is added to the invention (eg a sponge element, adhered to the invention); the invention, for example, may have a part made of sponge, or have an inner sponge (or soft) layer—in such a case, if that part of the invention is clearly of a material/nature that provides padding, then this falls within a scope of what is defined in the present application as a 'padding feature'.

'Substantially'

It is known, to those with skill in the art of patenting, that the word 'substantially' can, in some instances, be used to broaden a term. It should be stated that, in the present application, use of the word 'substantially' with a term, to define a (characterizing) feature(s), gets all the benefit (ie the benefit of any broadening) afforded by use of the word 'substantially', and also includes within its scope the feature(s) being that term exactly, (without broadening). For example, if two features are described/defined in the present application as being 'substantially parallel', then that includes, within its scope, the features being 'close' to parallel (in so far as the word 'substantially' is deemed to broaden the term 'parallel'), and also includes within its scope the features being 'exactly' parallel).

'Attached' And 'Connected':

If a feature (or two features) are defined in a claim as being attached, that would include within its scope the feature (or two features) being permanently attached, (of course), and would also include within its scope the feature (or two features) being removably attachable, (because, if removably attachable, the feature (or two features) can be attached, and therefore, when attached, would be within a scope of being 'attached'). Furthermore, the feature (or two features) being defined in a claim as being 'attached' would also include within its scope the feature that is defined as being 'attached' being formed as one part with a portion or a whole of the other feature it is defined as being 'attached' to. For example, if a table leg is defined in a claim as being 'attached' to a table top, that would include within its scope the table leg being formed as one part with a whole of the table top (eg if the table leg and table top were formed as one piece of plastic, for example) and would also include within its scope the table leg being formed as one part with a portion (rather than a whole) of the table top (eg if the table top was formed of more than one part, and the table leg was formed as one part with a part of the table top, but not a whole of it).

It should be noted, some (few) patent offices require structural connection/relationship terms (in claims), to define structural connection/relationship between features of the claim. With this in mind, (and if it should be required, although it often is not), the term 'connected', if used in a claim, is a broad term, which includes within its scope direct connection, and also includes within its scope indirect connection. ('Direct' connection would be where two features, for example, are directly connected to each other (eg an arm is 'directly' connected to a shoulder). 'Indirect' connection would be where two features, for example, are connected, but via intermediate feature(s) (eg a person's foot is 'connected' to their head, but 'indirectly', (via their leg, abdomen, torso, etc, which are 'intermediate features')). Where the term 'connected' is used in a claim, it includes within its scope 'direct' connection, and also includes within its scope 'indirect' connection. The term may be used in a claim, (and is deemed supported), whether 'direct' and/or 'indirect' connection embodiment(s) is (/are) disclosed in the present application, and, as stated, includes within its scope 'direct' connection, and also includes within its scope 'indirect' connection. Furthermore, if a feature(s) is (/are) defined as being 'connected', that would include within its scope the (or any—ie more than one of the said) feature(s) being removably attachable, if, when attached, the feature(s) is (/are) in a state of being 'connected', (directly or indirectly). Thus if a first feature is defined as being 'connected' to a second feature, it would include within its scope the first feature and/or the second feature being removably attachable, if, when attached, the first feature is connected to the second feature, (directly or indirectly). Furthermore, of course, (and similarly to the word 'attached'), if a feature (or two features) are defined in a claim as being 'connected' it would also include within its scope the feature that is defined as being 'connected' being formed as one part with a portion or a whole of the other feature it is defined as being 'connected' to.

'The Or Each'

The term 'the or each' (either in disclosure and/or a claim) can refer back to a single feature/thing, and/or can refer back to a plurality of features/things. When the term is read as referring back to a plurality of features/things, it should be taken as meaning, and including within its scope, 'at least one, or more, or all (ie each)' of the said features/things. Thus, to give an example, if a square is referred to/disclosed that has four corners, if the term 'the or each corner' is used, it includes within its scope 'one of the corners, (or two, or three, or all of the corners)'.

When any one feature/thing is afforded any feature(s)/definition in the present application, it is taken as read that, where a plurality of the said feature/thing is provided, 'the or each' said feature/thing may be provided/claimed comprising the said feature(s)/definition (ie at least one, or more or all). Similarly, wherever a plurality of the said feature/thing are afforded any feature(s)/definition, it is taken as read that 'the or each' said feature/thing may be provided/claimed comprising the feature(s)/definition (ie at least one, or more, or all of the plurality), and/or that even just one said feature/thing may be provided/claimed comprising the feature(s)/definition in an embodiment/claim wherein an invention is defined as comprising 'a' (eg singular) said feature/thing.

Reference To Multiple Similar Elements In Plural

In the present application, there may be provided/numbered features wherein the same primary number is used, with a suffix. For example, a first side of the/an invention may be numbered 600', and a second side of the/an invention numbered 600". In any such case (or where any other suffix is used, such as l' and 'R' to denote 'left' and 'right') when such features are referred to together (ie 'the sides'), the plural may be numbered/referred to with the primary number (without the suffix). Thus the first side 600' and second side 600" may, for example, be referred to simply as 'the sides 600'. Furthermore, if a side is referred to (not specifying which one of the sides), the primary number (ie 600, for example) may be used, without any suffix.

BACKGROUND

It is known in the art for visual media displays to be attached to vehicles. It is also known, generally speaking, for adhesive solutions to be used, to attach items to a surface. However, these tend to either go on the surface (the item is being attached to) before the item is attached, or go on an underside of the item (to be attached), before it is attached to the surface. In terms of attaching visual media displays to vehicles, this may not be efficient and/or reliable at keeping the visual media display attached, (especially at the edge/perimeter of the visual media display, for example). This may lead to other, non-adhesive attachment solution(s) needing to be used, in conjunction with the adhesive solution, to make sure the visual media display stays attached. Furthermore, it may leave a problem of the perimeter of the visual media display not being water-tight. (This may, again, lead to further feature(s) needing to be provided, to solve this problem). (It would be desirable if a solution was provided that was able to provide some waterproofing for a portion or a whole of the perimeter of the visual media display).

SUMMARY

Examples of the present invention seek to provide a solution to any or all of the above problem(s) by providing: an attachment apparatus, for attaching an electronic visual media display unit to a vehicle, comprising: a containing arrangement that goes over a portion or a whole of the electronic visual display unit; and an adhesive arrangement, to facilitate adhering the attachment apparatus, and thus facilitate attaching the electronic media display unit, to an outside of the vehicle, wherein a portion or a whole of the adhesive arrangement adheres to the outside of the vehicle, outside a portion or a whole of a perimeter of the electronic media display unit, to facilitate attachment.

According to another aspect of what is invented, there is provided: a media display unit and data transfer system, comprising: an electronic visual media display unit, for displaying media on an outside of a vehicle; and a display data receiver, separate from the electronic visual media display unit, for receiving display data, to be displayed on the media display unit, and for transferring the display data to the media display unit.

(The term 'electronic' is here used as a broad term, simply to differentiate from static (eg wooden, plastic, etc) signage, (although static media displayed via electronic means (eg a 'PNG' file, (or the like-eg any image file), for example), may be used). Relating to use of the term 'electronic' in the present application, the term is used to broadly to mean 'in any way involving electronics'—eg a device which in any way uses electronics, to fulfil its end, is deemed an 'electronic device', for example). (All computer devices, for example, are included within the scope of the term 'electronic device').

According to another aspect of what is invented, there is provided: a vehicle media display unit transfer system, comprising: an electronic visual media display unit, for displaying media on an outside of a vehicle; and a computer device that facilitates at least one of: creation of display data, for displaying on the visual media display unit; and transfer of the display data to the media display unit.

Preferably the computer device is a portable computer device. (Smartphone, tablet, laptop are all examples of a portable computer device). (Most preferably, the computer device is preferably a smartphone).

Preferably the computer device (eg smartphone) runs an application(s), that facilitates at least one of: creation of display data, for displaying on the visual media display unit; and transfer of the display data to the media display unit (As stated, preferably the computer device is a portable computer device).

The computer device (eg smartphone) may transfer the display data to the media display unit directly and/or indirectly. (The terms directly and/or indirectly are here used with reference to whether any other computer device(s) are transferred to, (between the data being transferred from the computer device (eg smartphone) to the media display unit). For example, if the computer device (eg smartphone) transfers the display data to another device/system (eg a computer device (such as another smartphone, or computer, for example, of the user)), and then the data is then, from the other computer device, transferred to the media display unit, then that is an example of the smartphone 'indirectly' transferring the display data to the media display unit. However, if there is no such intermediary device(s), then, whether the display data is transferred from the smartphone to the media display unit with wire(s), or wirelessly, then that is an example of 'direct' transfer of display data.

(Note, where the term 'at least one of: directly; indirectly', or 'directly and/or indirectly', or the like is used, (or words to that effect), and especially when such a term is used in a claim, it means (and includes within its scope) that both direct, and indirect, transfer of display data, (rather than simply one or the other). (It should also be stated that there may be just one, or the other—ie just direct transfer may be possible, and not indirect transfer, or just indirect transfer may be possible, and not direct transfer). (Preferably the computer device (eg smartphone) runs an application(s), that facilitates any or all of these things).

(Preferably the smartphone runs an application or applications that facilitates both: creation of display data, for displaying on the media display unit; and transfer of the display data, directly or indirectly, to the media display unit).

Preferably only one application is used/needed on/by the smartphone, to carry out such function(s). However, it is feasible more than one applications is needed/used. Thus the term 'application or applications' is used, to imply this.

According to another aspect of the invention, there is provided: a vehicle media display unit system, comprising: an electronic visual media display unit 12, for displaying media on an outside of a vehicle 14; and an attachment apparatus 10. (According to this aspect, the attachment apparatus is not limited to comprising an adhesive arrangement, and may use any attachment means, for attachment, (eg screw(s), and/or bracket(s), and/or adhesive arrangement(s), and/or any other feature(s) for attachment, not limited to the aforementioned examples). (According to this aspect, the attachment apparatus may be any shape and/or size and/or design, etc).

According to another aspect of what is invented, there is provided: an apparatus, comprising: a containing arrangement that goes over a portion or a whole of an electronic media display unit; and an adhesive arrangement, to facilitate adhering the apparatus to an outside of the vehicle, wherein a portion or a whole of the adhesive arrangement adheres to the outside of the vehicle, outside a portion or a whole of a perimeter of the electronic media display unit, to facilitate adhering the apparatus to the outside of the vehicle. According to this aspect, the apparatus may, or may not, play a primary role (or any role at all), in attachment of the media display unit to the vehicle.

The second aspect (and/or any further/other aspect(s)) may comprise any of the feature(s) of the first aspect and may draw upon any of the feature(s) and/or disclosure of the present application, as optional and/or preferable feature(s). Any aspect may comprise any feature(s) of any other aspect(s), whether the feature(s) be essential or preferable and/or optional to the other aspect(s).

BRIEF DESCRIPTION OF THE DRAWINGS

Examples of the present invention will now be more particularly described, with reference to the accompanying drawings, by way of example only, in no way limiting a scope of the invention, in which.

Note: At some patent offices, when claim(s) are allowed for patent, it is required that Figures that show embodiments that do not comprise all the features of the/an invention claimed are denoted as 'not being claimed' or 'not within a scope of what is claimed' (or words to that effect). Even in such case, it will be apparent that such Figure(s) may or do show feature(s) that are essential, or preferable and/or optional, to the/an invention claimed, which will be apparent, in light of the disclosure. Thus such Figure(s), (and/or disclosure related to such Figure(s) and/or embodiment(s)), should nevertheless be considered relevant to the/an invention claimed.

DETAILED DESCRIPTION

Referring to the drawings, there is shown an attachment apparatus 10, for attaching an electronic visual display unit 12 to a vehicle 14, comprising: a containing arrangement 16 that goes over a portion or a whole of the electronic visual display unit 12; and an adhesive arrangement, to facilitate adhering the attachment apparatus, and thus facilitate attaching the electronic media display unit, to an outside of the vehicle, wherein a portion or a whole of the adhesive arrangement adheres to the outside of the vehicle, outside a portion or a whole of a perimeter of the electronic media display unit, to facilitate attachment.

Preferably, the attachment apparatus 10 mostly or fully surrounds the perimeter of the electronic media display unit 12. (The term 'mostly' here would define an embodiment wherein the attachment apparatus surrounds more than fifty percent, in total, of the perimeter of the electronic media display unit 12—ie fifty one percent or more).

Preferably, the attachment apparatus 10 fully surrounds the perimeter of the electronic media display unit 12.

Preferably, the adhesive arrangement mostly or fully surrounds the perimeter of the electronic media display unit 12.

Preferably the adhesive arrangement fully surrounds the perimeter of the electronic media display unit 12.

Figure 1:
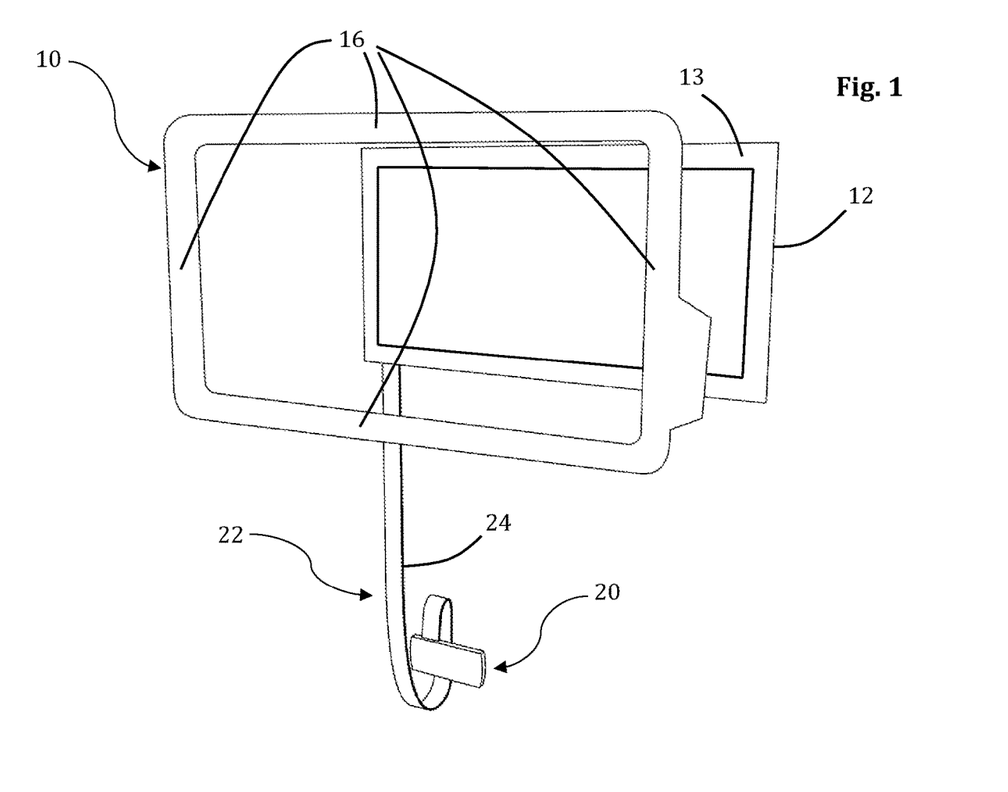
FIG. 1 is a perspective view, showing an example visual display unit, and showing a preferred embodiment of an attachment apparatus, for attaching the visual display unit to a vehicle, the attachment apparatus having adhesive properties.
Figure 2:
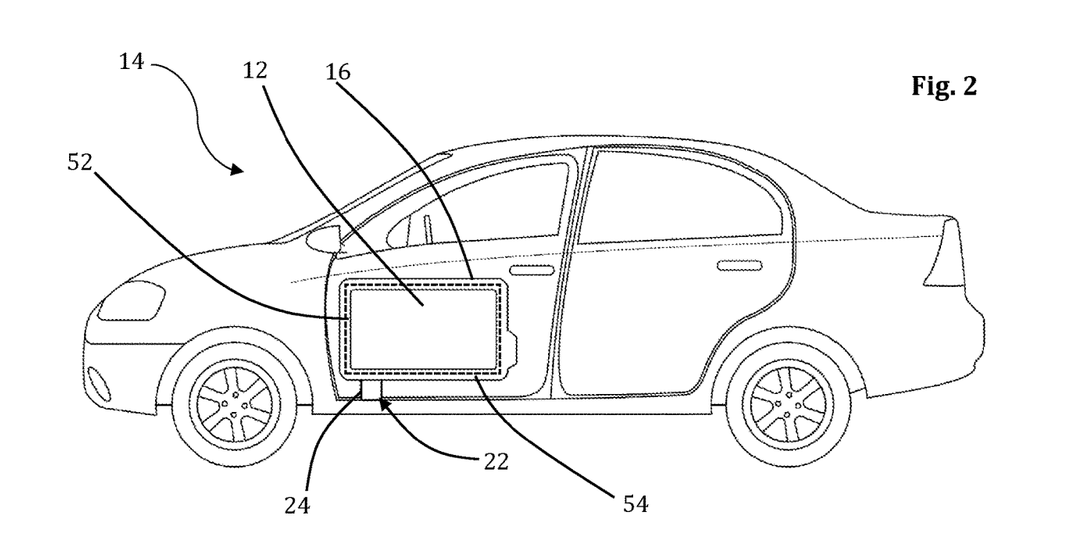
FIG. 2 is a side view of a car, with a visual display unit attached to a door of the car with the example attachment apparatus.

It is apparent, (by virtue of the disclosure of FIG. 1 and FIG. 2), that, in the example shown in FIG. 2, at least a portion of the attachment apparatus goes/is on top of at least a portion of the visual media display unit(s). (Note: This result can be achieved whether or not the attachment apparatus goes on 'after' the visual media display. Thus, in some embodiments, the visual media display unit(s) may be attached to (and/or placed on) the outside of the vehicle, and the attachment apparatus may then be put on, (ie 'after' the visual media display unit(s)). In other embodiments, the attachment apparatus may be attached to the visual media display unit(s), and then both (ie the visual media display unit(s) and the attachment apparatus) may be attached to the outside of the vehicle together).

(Note: Whilst the examples in the drawings show the attachment apparatus attaching just one visual media display unit, it is feasible embodiments may be provided wherein the (or any) attachment apparatus attaches a plurality of visual media display units. Furthermore, (as will be apparent in light of the disclosure of the present application), a plurality of the attachment apparatuses may be used, for one vehicle).

In the example of FIG. 1, the example attachment apparatus 10 is shown having curved edges. However, it may equally have straight edges. (Similarly, the example electronic media display unit 12 is shown having straight edges, but may equally have curved edges. (It should also be stated the shape of the example attachment apparatus and example electronic media display unit are provided by way of example only in the examples, and the attachment apparatus and electronic media display unit may feasibly be of any shape. (Preferably the shape of the attachment apparatus 10 matches the shape of the electronic media display unit 12, either exactly, or closely).

In the example of FIG. 1, for example, the electronic media display unit is shown comprising an example border 13, (and a display (area) is shown within the border). It will be known that many displays have a border (ie a part that borders the display), which itself does not display media. Such borders are often made out of plastics, and often provide structural support. However, it should be stated that embodiments may be provided where the electronic media display unit does not comprise a border. It is also worth noting that, whilst previously electronic media display units tended to be structurally solid (and not changeable in shape), technology now allows for flexible electronic visual displays. These often tend to be very thin. Flexible electronic visual displays are even less likely to have a border, (although they may have a border). A flexible electronic visual display, whether or not it has a border, is an embodiment of an electronic visual display unit.

(The containing arrangement may or may not encroach over any of the display of the electronic media display unit. For example, if the electronic media display unit comprises a border, the containing arrangement may only encroach over the border (a portion or a whole of the border), without encroaching over the display area of the electronic media display unit. However, it is feasible the containing arrangement may encroach over a portion of the display area).

Preferably, the containing arrangement 16 contains the electronic media display unit on all sides. (Note: It is feasible, (although unlikely) that the containing arrangement 16 could contain the electronic media display unit on all sides, but without mostly or fully surrounds the perimeter of the electronic media display unit 12. It could do this, for example, by the attachment apparatus being of such a shape/structure such that the containing arrangement contains a portion, for example, of the left side of the electronic media display unit; and contains a portion, for example, of the right side of the electronic media display unit; and contains a portion, for example, of the top side of the electronic media display unit; and contains a portion, for example, of the bottom side of the electronic media display unit, with the portions, together, not amounting to most, or a whole, of the perimeter of the electronic media display unit being surrounded. This would be an unusual embodiment, (and may look odd in shape/structure). However, it is possible, and therefore is here mentioned. Thus it could be stated that preferably the containing arrangement 16 contains the electronic media display unit on 'at least a portion of' all sides)).

Preferably, the attachment apparatus 10 relies solely on the adhesive arrangement to facilitate attaching the electronic media display unit to the outside of the vehicle. (It is feasible other feature(s) may be provided, to help with attachment, (such as screw(s), for example). However, as stated, preferably the attachment apparatus 10 relies solely on the adhesive arrangement to facilitate attaching the electronic media display unit to the outside of the vehicle.

Preferably the attachment apparatus in no way penetrates any part of the electronic media display unit, and in no way penetrates any part of the outside of the vehicle, to facilitate attachment. (This can be a big advantage of using adhesive solutions, as opposed to mechanical penetrative solutions, (such as screw(s), for example). The example of FIG. 1 and FIG. 2 clearly shows an example where the attachment apparatus 10 relies solely on the adhesive arrangement to facilitate attaching the electronic media display unit, (and are also examples of wherein the attachment apparatus in no way penetrates any part of the electronic media display unit, and in no way penetrates any part of the outside of the vehicle, to facilitate attachment).

Preferably, a portion or a whole of the attachment apparatus is deformable. (Preferably the attachment apparatus is made partially or wholly of vinyl, which is an embodiment that is partially or wholly deformable. (However, it will be apparent that vinyl is just one example of a deformable material, and various other material(s) may be used that are deformable, not limited to vinyl).

Preferably, a whole of the attachment apparatus is deformable. (Preferably the attachment apparatus is made of vinyl, and the whole of the attachment apparatus is deformable).

In the example(s) of the Figures, a whole of an underside of the attachment apparatus is adhesive. Therefore, in the examples, the adhesive arrangement is provided on a whole of the underside of the attachment apparatus. However, it will be apparent, (in the example of FIG. 1, for example, or other embodiments, that only a portion of the underside of the attachment apparatus may be adhesive. (Note: it is possible there are 'gaps' in the adhesive arrangement; for example, whilst in the example of FIG. 1, (as stated), a whole of the underside of the attachment apparatus is adhesive, (and the adhesive arrangement thus fully surrounds the perimeter of the electronic media display unit 12 in the example), it is feasible, in the example, that not all of the underside is adhesive—there may be portion(s) that are not adhesive, and thus there may be 'gap(s)' in the adhesive arrangement. Thus the adhesive may or may not fully surround the perimeter of the electronic media display unit 12).

Figure 5:
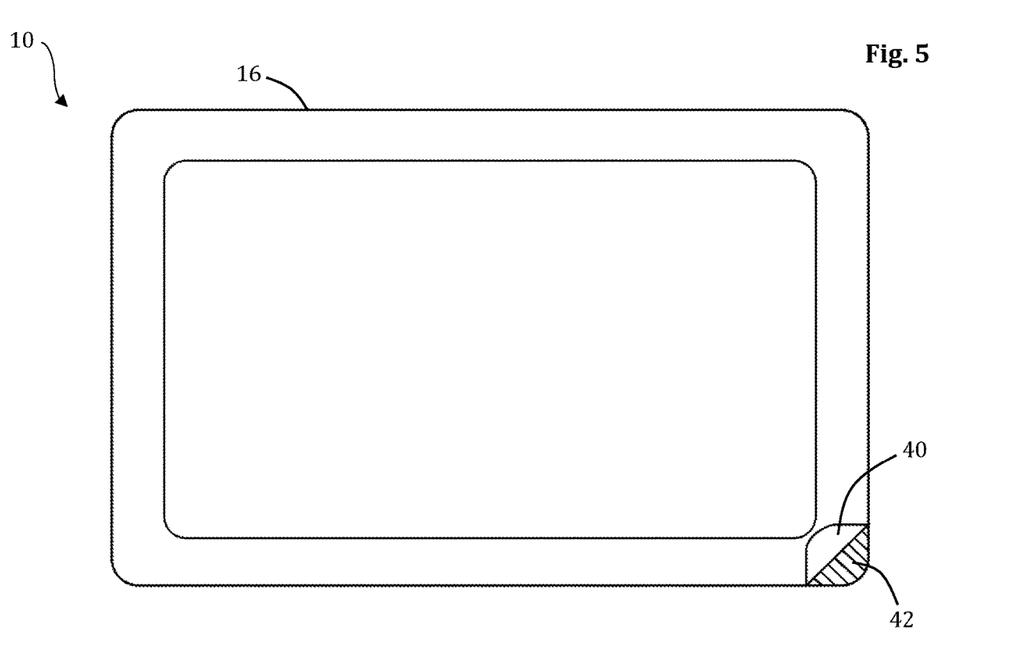
FIG. 5 is a back view of an example embodiment of the attachment apparatus, showing an example covering element being peeled off.

In the example of FIG. 1, (and preferably), the adhesive arrangement is provided by an adhesive surface(s) on an underside of the attachment apparatus, wherein a pull-off element(s) (which may also be referred to as a 'covering element(s)' is provided on the or any adhesive surface(s). Thus a thin pull-off element(s) may be provided, so that the adhesive surface(s) are not revealed, until needed. The pull-off element(s) can then be pulled off, eg just before attaching the attachment apparatus. (An embodiment is shown, in FIG. 5, showing an example covering element being peeled off. FIG. 5 shows an example of the attachment apparatus. In FIG. 5, a back (which may also be referred to as an 'underside') of the apparatus is shown. In the example, a whole of the underside of the apparatus is adhesive. An example covering element 40 can be seen, in process of being peeled off. A portion 40' of the covering element can be seen, already having been peeled off the underside of the attachment apparatus. This reveals a portion 42 of an underside of the apparatus that is adhesive. (The portion 42 is shaded, simply for greater clarity. Thus this example portion 42, with the example covering element peeled off it, is now ready to be used adhesively. Intend, in the example, is that the whole example covering element is peeled off, (or, to use a broad term, 'removed'). (The example attachment apparatus may then be used, similarly, (for example), as shown in the example of FIG. 2).

(Note: If any adhesive element(s) is added to the containing arrangement, (to facilitate adhering it to an outside of the vehicle, outside a portion or a whole of a perimeter of the electronic visual display unit), then that is within a scope of 'an adhesive arrangement, to adhere to an outside of the vehicle, outside a portion or a whole of a perimeter of the electronic visual display unit'. Thus, for example, if glue (or any agent, to facilitate adhering) is applied to a portion or a whole of the underside of the containing arrangement (that goes over a portion or a whole of the electronic visual display unit), for example, and this is used, to adhere it to an outside of the vehicle, outside a portion or a whole of a perimeter of the electronic visual display unit, then that is within a scope of 'an attachment apparatus, for attaching an electronic visual media display unit to a vehicle, comprising: a containing arrangement that goes over a portion or a whole of the electronic visual display unit; and an adhesive arrangement, to adhere to an outside of the vehicle, outside a portion or a whole of a perimeter of the electronic visual display unit'. (And is within a scope of a portion or a whole of an underside of the containing arrangement being adhesive). Thus a 'separate' agent(s)/element(s) may be used, to form the attachment apparatus. (Another example, for example, would be a double-sided sticky element(s). This could be laid onto an underside of the containing arrangement, for example, and, for example, it could then be cut, around the containing arrangement. (For example, one side of the double-sided stick element(s) could be stuck to an underside of the containing arrangement. the other side of the double-sided stick element(s) may have a film/covering element on it, for example, which could then be removed, to reveal the sticky/adhesive surface(s)). This sticky underside would then, effectively, become the underside of the containing arrangement. Thus this would be an example of wherein a portion or a whole of the underside of the apparatus is adhesive. Thus various options and/or embodiments are possible. (It should also be stated, a heat-treated adhesive agent(s) may be used, wherein the adhesive only becomes sticky/adhesive, when heated. This could be used, to lay the containing arrangement in position, (ie on top of the portion or the whole of the electronic visual display unit, and on the vehicle), and then heat-treat it, to make it adhesive. (This is just one example of how heat-treated adhesive may be used. (It is also feasible the or any heat-treatable adhesive could be heat treated, before it is placed/used in position, and then, (quickly after having been heat-treated, could then be placed/used, in the appropriate position/way)))).

(Note: Whilst, in the embodiments shown, only one attachment apparatus 10 is used, it is feasible embodiments may be provided wherein more than one attachment apparatus 10 is used. For example, one may be used at one side of the (or any) visual media display unit. Another may then be used at the other side of the (or any) visual media display unit. This may thus have much the same affect as the one attachment apparatus 10 as shown/described. However, it will be apparent that it is much the more elegant solution for there to be just one attachment apparatus 10, to fulfil the function. (Nevertheless, it has here been stated that a plurality of attachment apparatuses may be provided, for just one visual media display unit, feasibly). (As will also be apparent, it is feasible a plurality of visual media display units may be used/provided for just one vehicle. In some embodiments, only one attachment apparatus 10 may be used/needed, for more than one (of the plurality), or all (of the plurality) of visual media display units. Thus the attachment apparatus may feasible be used, for more than one visual media display unit. Of course, it is also possible, if there is a plurality of visual media display units that just one attachment apparatus 10 is used/provided for one, or more than one, or all (of the plurality) of the visual media display units. (Any combination/permutation of the above options is possible, and may feasibly be provided/implemented).

Figure 4:
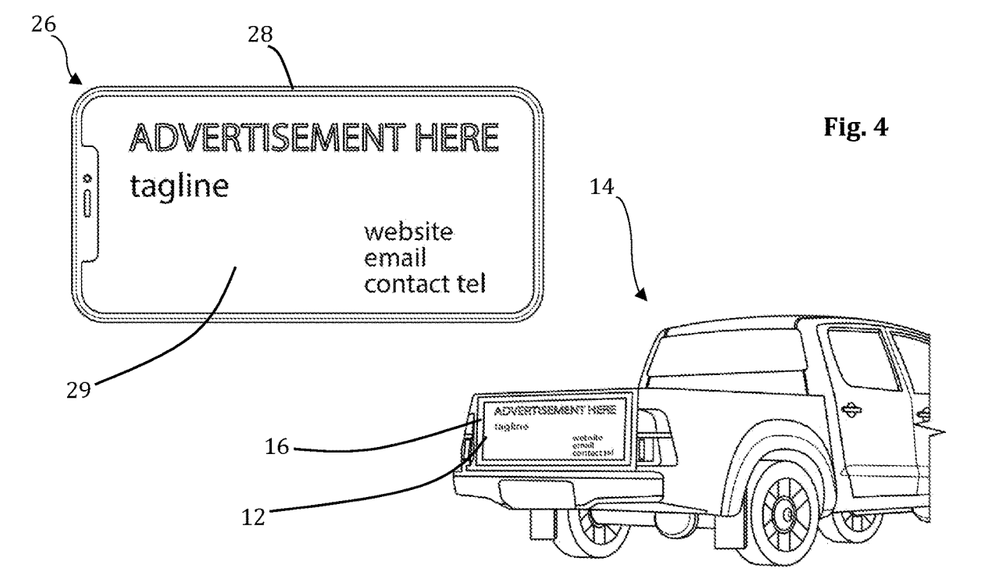
FIG. 4 shows an example of a visual display unit being used on a different location of a car/vehicle, and also shows how a smartphone (or any computer device) may be used, and a design for the visual display screen may be sent from the smartphone (or any computer device) to the visual display screen.

In the example of FIG. 4, the display area of the media display unit is shown displaying a static (albeit, facilitated by electronics) media, (which in the example, reads 'ADVERTISEMENT HERE'). (For example, this could be a PNG, GIF, or JPG image, for example, or any other relevant filetype, for example. In other examples, video and/or animation media may be shown/provided). This could be an advertisement, for example, for a company, and/or person, or anything, etc. (An advertisement is used by way of example only, and it is feasible the media display unit may display a display(s) that is not an advertisement. (What is shown is provided/shown by way of example only). As shown, other information may be provided. (For example, any or all of: a tagline; a website (URL); an email; a contact telephone number; (or any other information), may be provided). (This is denoted on the example display area). (This (the phone number/website, etc, or anything) may (or may not) be animated). (Files such as flash, MP4, PNG, JPG, or any other relevant file(s) may feasibly be used, for display). Thus motion/moving, or static imagery can be displayed. It is also feasible that images (or any displayed matter, whether motion or static) may be shown, in rotation. For example, in the example of FIG. 4, the displayed matter shown may disappear (eg via fading and/or animation, (or any transition), (or may simply 'change', without a transition)) and be replaced by a next display. The next display may include, for example, a phone number and/or a website (and/or any further data about what is being advertised). It is even feasible that a totally different display is displayed, not related to what is advertised on this display example, (eg a different advertisement, for example). Thus a wide array of options are available for display and a wide array of things can be displayed.

Preferably, the electronic media display unit 12 is able to receive display data, with regard to what is displayed by the media display unit 12. (Eg an advertisement, (or any media at all)).

The media display unit may be able to receive display data, with regard to what is displayed by the electronic media display unit, directly, the electronic media display unit configured to receive the display data, without requiring a separate display data receiver. For example, in the example of FIG. 4, the example media display unit, in the example, is able to receive display data, directly, from the example computer device 26, (which is a smartphone, in the example). (In the example of FIG. 4, the example media display unit comprises relevant electronic component(s), to allow for receiving display data, directly). (The media display unit may be able to receive display data wirelessly, and/or by wire). Thus this functionality may be 'built-in' to the (or any) media display unit.

The electronic media display unit may be able to receive display data, with regard to what is displayed by the electronic media display unit, indirectly, the system further comprising a display data receiver to receive display data, wherein display data can be transferred from the display data receiver to the electronic media display unit 12. The (or any) display data receiver is electronic, and may be provided in several different ways. For example, the (or any) display data receiver may be a separate device from the electronic media display unit. (An example of a display data receiver 20 that is a separate device from the electronic media display unit is clearly seen in FIG. 1 and FIG. 3. (There is also a display data receiver 20 (that is a separate device from the electronic media display unit) internally in the vehicle in the example of FIG. 2, which is not visible)). However, it should be stated, in other embodiments wherein the electronic media display unit may be able to receive display data, with regard to what is displayed by the electronic media display unit, indirectly, the (or any) display data receiver may be provided in a different way. (For example, the (or any) display data receiver may be provided in a fixed position). The (or any) display data receiver may be provided under the attachment apparatus and/or the visual media display unit(s), for example. (Thus the adhesive arrangement may play a role in holding a display data receiver in place, for example). The (or any) display data receiver may be provided as part of a circuit board (and/or 'driver board'), for example. (This is provided by way of example only, and the (or any) display data receiver is not limited to being provided as part of a circuit board (and/or 'driver board')). The circuit board(s) (and/or 'driver board'), for example, may be provided in a fixed position. (Whether the (or any) display data receiver is provided as part of a circuit board (and/or 'driver board'), or not), the (or any) circuit board(s) (and/or 'driver board(s)') may be provided under the attachment apparatus and/or the visual media display unit(s). Thus, broadly speaking, (and not at all limited to disclosure relating to the or any) display data receiver, there may be provided a circuit board (and/or 'driver board') under the attachment apparatus and/or the visual media display unit(s). Thus, broadly speaking, the (or a) display data receiver, may be provided, as electronic component(s), which are not so much a 'separate device' (as the example shown clearly in FIG. 1 and FIG. 3, for example), but are nevertheless 'separate' to the visual media display unit. (In such an embodiment, (ie as described above), the separate display data receiver may transfer data to the media display unit via wiring, (and thus there may be provided a wiring arrangement(s)), and/or wirelessly).

(What is shown in FIG. 4 denotes that display data, (eg a display(s), in the example), may be stored and/or created on a computer device (which is preferably a portable computer device, and is most preferably a smartphone, but not limited to a smartphone). The display data (and/or a display data choice) may then be made, on the computer device. The display data, in the example, is then received (directly or indirectly) by the media display unit, and is displayed. The result of this is shown on the example media display unit on the vehicle in FIG. 4. (Whilst the image of the smartphone and vehicle are shown up close, in order to both be shown in the same drawing, it is feasible the computer device (which is preferably a smartphone) may be a long way apart. (In fact, they may feasibly be any distance apart)).

(Note: An example display/viewing screen 29 of the example smartphone is shown. (It will be apparent that a vast array of computer device comprise a display/viewing screen, (eg laptop, tablet, home/desktop computer (eg a 'monitor' of a home/desktop computer), etc). As shown in the example of FIG. 4, (and as will be apparent), this may be extremely important (and/or useful), with reference to creation and/or transfer of display data, (and/or for any other reason(s). (For example, simply if a user wants to 'choose' which display data is displayed on the media display unit, it will be apparent that a display/viewing screen, (eg on the smartphone shown, in the example, may be very important (and/or useful), in facilitating this. (For example, the user may be able to select (eg via cycling through), from various displays, to decide what is displayed on the (or any) media display unit(s)).

(The example display data receiver that is a separate device, (which may also be referred to as an electronic device that is separate from the visual media display unit, and which comprises a display data receiver) is simply one example of an electronic device for receiving, (and transferring) display data. It will be apparent that a wide array of embodiments may be provided, of varying different sizes and/or shapes, and/or designs, and/or nature. Thus various options and/or embodiments are possible).

Preferably, display data can be transferred from the display data receiver 20 to the electronic media display unit 12, wirelessly. This may be achieved in any and/or many way(s). For example, transfer of data between the display data receiver and the media display unit may be achieved via the internet. And/or it may be achieved via Bluetooth, (and/or any other way(s)).

Preferably, there is provided a wiring arrangement 22, (ie at least one wire), to facilitate transfer of data from the display data receiver to the electronic media display unit. (In the examples of FIGS. 1, 2 and 3, for example, there is at least one wire (and hence a wiring arrangement) connecting the example display data receiver to the electronic media display unit, (and facilitating transfer of data). (IT should be stated, in various embodiments, it is possible that wireless, and wired, transfer of display data is possible, (rather than just one, or the other).

Preferably, the display data receiver is located internally within the vehicle, and the wiring arrangement 22 travels through a door perimeter of the vehicle. (This is best shown in FIG. 2, where, in the example shown, the display data receiver is located internally within the vehicle, and the wiring arrangement 22 travels through a door perimeter of the vehicle).

The term 'door perimeter' is here simply a term that means the perimeter of the vehicle door where it opens and closes. Whilst in the example of FIG. 2, the wiring arrangement is travelling through the lower part/side of the door perimeter, it may travel through any part of the door perimeter. Thus, in the example of FIG. 2, the door has been closed, and the wiring arrangement is nevertheless travelling through, into the vehicle.

Preferably, there is provided a protecting arrangement 24 that is configured to travel through the door perimeter and protect the wiring arrangement. (In the example, the protecting arrangement comprises a cord element. However, many different variations and/or embodiments of a protecting arrangement may be provided, (and many different shapes, for example, not limited to the example(s) given). Thus various options and/or embodiments are possible). The protecting arrangement partially or wholly covers a portion or a whole of the wiring arrangement, to thus protect it. (Various feature(s) and/or material(s) may be used to protect the wiring. For example, this may include rubber, plastic, fabric, for example, or any other relevant matter/material(s)). (In the example, the protecting arrangement comprises (and/or 'takes the shape of') a belt).

The example display data receiver may be located and/or placed/situated internally within the vehicle. (Whether or not there is a wiring arrangement to facilitate transfer of data from the display data receiver and the media display unit, the display data receiver may be located and/or placed/situated internally within the vehicle). For example, even if there is not a wiring arrangement, data may feasibly be transferrable from the display data receiver to the media display unit, eg via the internet, Bluetooth, and/or any other way(s). For example, it is even possible a portable storage medium, (such as a USB stick, or memory card, or the like) could be used, to transfer data. (However, such solutions may not be ideal, because they tend to require that any device(s) they are use with have a 'port(s)', (eg a USB port(s), for example). This may take up space, which may not be ideal. Thus other solutions are preferred, (although such solutions are nevertheless feasible).

Preferably, the system further comprises a further separate computer device 26, from which data can be received by the electronic media display unit. (The further separate computer device may transfer the display data to the media display unit directly and/or indirectly). Thus data may be received by the electronic media display unit either directly (eg without need for a separate display data receiver, (or any other computer device(s))), or indirectly (and thus may be sent to the/a separate display data receiver, for example, (or any other computer device(s)), and then on to the media display unit).

Preferably, the computer device is a smartphone, (an example of this is shown in FIG. 4). Preferably the computer device (which is preferably a smartphone) runs an application or applications to facilitate transfer of the display data to the electronic media display unit. (It may do so directly and/or indirectly). (However, the computer device could be, for example, a regular computer (eg a personal computer). The computer device could be a desktop computer, a laptop, a tablet, etc, etc. Any of these devices could be the further separate computer device. (A plurality of such devices may be usable to facilitate transfer of the display data to the electronic media display unit, either directly (ie without need for a separate display data receiver), or indirectly (and thus may be sent to the/a separate display data receiver, and then on to the media display unit).). (As will be mentioned, it is feasible such device(s) may be used to create display data).

Preferably, the computer device is a smartphone, which runs an application or applications to facilitate transfer of the display data to the display data receiver, (preferably directly to the electronic media display unit, without requiring a separate display data receiver).

According to another aspect, there is provided a media display unit and data transfer system, comprising: an electronic visual media display unit 12, for displaying media on an outside of a vehicle; and a display data receiver 20, separate from the electronic visual media display unit 12, for receiving display data, to be displayed on the media display unit 12, and for transferring the display data to the media display unit.

(According to this aspect, the media display unit may be secured/attached in any way, not limited to use of an adhesive arrangement. For example, it may be attached via screw(s) and/or a bracket(s), and/or magnetic solution, or any other way).

Preferably the display data can be transferred wirelessly from the display data receiver to the media display unit.

It may be that the display data can be transferred via wiring from the display data receiver to the media display unit. (This wiring could be removable/portable wiring, (eg portable wiring, for example like wiring that a person can use to attach two (computer) devices, (such as a smartphone and personal computer, for example)), and/or may feasibly be wiring partially or wholly built-in to the system. (Thus the or any wire(s) may be detachable from one or both of: the display data receiver; the electronic visual media display unit, (or may not be)). Thus various different options for wiring are possible and plausible, as will be apparent. (Thus it will be apparent that the examples provided/shown are provided by way of example only, and various options and/or embodiments are possible).

Preferably the display data receiver 20 is located internally, within the vehicle. (FIG. 2 is an example of this).

(It may be that the display data receiver is located internally, within the vehicle, whether or not data can be transferred from the display data receiver to the media display unit wirelessly, and/or via wiring).

It may be that the display data receiver is located internally, within the vehicle, and there is provided a wiring arrangement 22 between the media display unit 12 and the display data receiver 20, to connect the display data receiver and the media display unit and to facilitate transfer of data between the display data receiver and the media display unit, and wherein the wiring arrangement 22 travels through a door perimeter of the vehicle. (An example of this is shown in FIG. 2).

Preferably there is provided a protecting arrangement 24 that is configured to travel through the door perimeter and protect the wiring arrangement.

Figure 3:
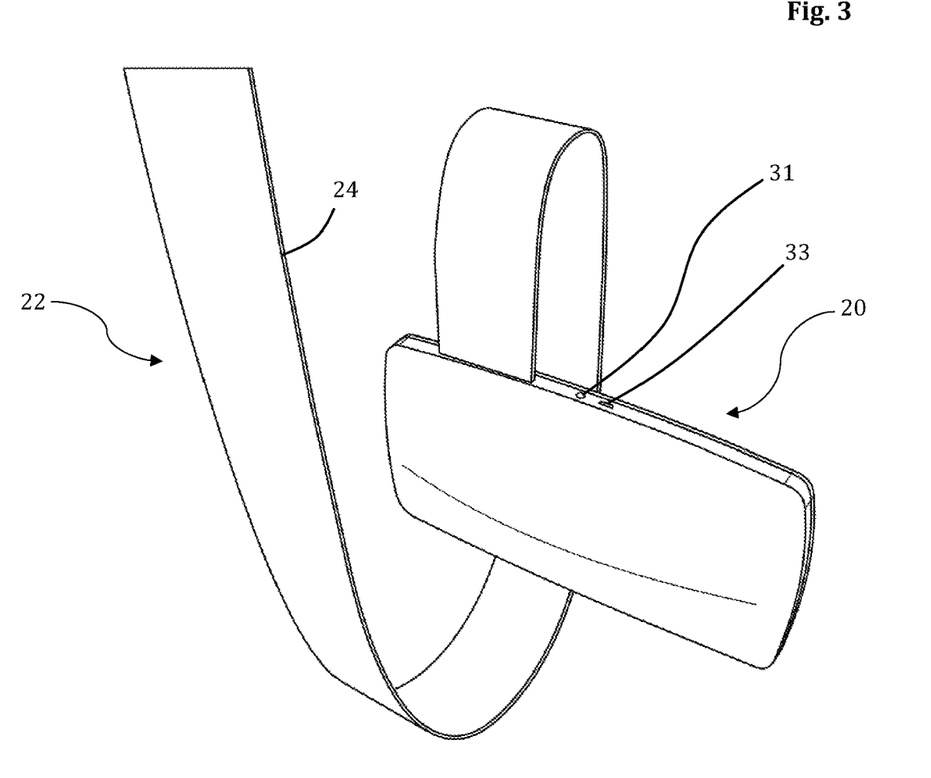
FIG. 3 shows a close-up via of an example media device, which may be used, to send screen data to a visual display unit.

Preferably the protecting arrangement 24 is elongate. Preferably the protecting arrangement 24 is substantially flat at a point where it travels through the door perimeter. (Examples of this are shown in FIG. 1 and FIG. 3 and particularly well in FIG. 2). (Preferably the protecting arrangement is substantially flat along most (ie more than fifty percent (ie fifty-one percent or more)), or all its length. This, again, is shown in the examples, and is shown most clearly/visibly in the example of FIG. 1).

There may be provided a further computer device 26, on which the display data may be created. (Display data transfer from the or a further computer device may be possible wirelessly and/or via wiring. Display data transfer from the or a further computer device may be possible directly and/or indirectly).

Preferably the display data can be transferred from the further computer device 26 to the display data receiver 20. (This may be done wirelessly and/or via wiring). (This may be done directly, and/or indirectly).

Preferably the further computer device is a smartphone, and the smartphone facilitates at least one of: creation of the display data; and transfer of the display data to the display data receiver. (This may be achieved via the smartphone running an application or applications, to facilitate this). (Preferably the smartphone facilitates both: creation of the display data; and transfer of the display data to the display data receiver). This may be achieved via the smartphone running an application or applications, to facilitate this). (Note: Whilst the example is given of the 'further computer device' being a smartphone, it is in no way limited to being a smartphone, (and this has been made clear in the present application). Preferably it is a portable computer device, (eg tablet device, smartphone, (or even laptop, for example), but it is not limited to being portable. (For example, it could be a home (desktop) computer). Of course, there may be many further computer devices that may be usable. It should also be stated, whilst running of an application(s), (to facilitate various functionality), is often mentioned, in the present application, with regard to a smartphone, it should be noted that running of an application(s) is not at all limited to a smartphone, and any computer device may feasibly use/run an application(s), (to facilitate various functionality). Thus, wherever there is disclosure, in the present application, of a smartphone running/using an application(s), (to facilitate various/any functionality), it should be stated that such disclosure supports any computer device, (not limited to a smartphone), (and thus any portable computer device, for example, but not limited to portable computer devices), running/using an application(s), (to facilitate various/any functionality)).

According to another aspect, there is provided: a vehicle media display unit transfer system, comprising: a media display unit; and a computer device, wherein the computer device facilitates at least one of: creation of display data, for displaying on the visual media display unit; and transfer of the display data to the media display unit. Preferably the computer device is a smartphone, although it may be any computer device. For example the computer device may be a home computer, or a tablet device, for example. It may even feasibly be a bespoke computer device, (bespoke for the system), for example. (Any or all such devices may be used as, (and therefore may 'be'), the computer device. (It is feasible a plurality of computer devices are usable for such purpose)).

Preferably the computer device, (which is most preferably a smartphone), runs an application or applications that facilitates at least one of: creation of display data, for displaying on the visual media display unit; and transfer of the display data to the media display unit.

The computer device, (which is most preferably a smartphone), may transfer the display data to the media display unit directly and/or indirectly.

Preferably the computer device, (which is most preferably a smartphone), runs an application or applications that facilitates both: creation of display data, for displaying on the media display unit; and transfer of the display data to the media display unit.

Preferably, the computer device, (which is most preferably a smartphone), is able to transfer display data to the media display unit, and transfers the display data to the media display unit directly.

The media display unit may be able to receive display data wirelessly.

The computer device, (which is preferably a portable computer device, (eg smartphone, or tablet computer device, or laptop, for example), and is most preferably a smartphone), may potentially may be usable, (and may be useful), to store created display data, for example, and/or to allow a user to choose what data to show on the media display unit. (The computer device, (which is most preferably a smartphone), may then send display data directly to the media display unit, (for displaying), (and/or may send display data indirectly to the media display unit, (eg via a display data receiver, with the display data then/ultimately being transferred to the media display unit). Embodiments may be provided wherein the media display unit(s) may receive display data directly. (Thus the media display unit(s) may comprise relevant electronic feature(s)/component(s), to facilitate receiving display data). Thus the media display unit(s) may be configured to receive display data directly.

As stated, it may that the computer device, (which is most preferably a smartphone), allows a user to make a 'display data choice'. The choice may be just one display, or a plurality of displays. (The example in FIG. 4 shows just one display being shown on the media display unit, but it is feasible a plurality of displays may be shown by the media display unit(s). Thus the media display unit(s) may 'cycle' through a plurality of displays, (eg showing each display for a set time, (eg five to 10 seconds, for example, or any amount(s) of time). Thus various options are possible. The (or any) display data choice may be sent to the media display unit(s), directly, or indirectly. The or any display(s) may, or may not, be sent, with the display data choice. (The display(s) may feasibly already be stored by the media display unit(s) and/or a display data receiver(s), for example. (It should also be stated, the display data choice may be sent indirectly, (ie not to the media display unit(s)), and the display(s) chosen may then be sent to the media display unit(s). For example, the choice may be sent to a display data receiver. The display data receiver may itself have the displays stored, and may then send the displays to the media display unit(s). (This, for the sake of the present application, would still be considered to be within a scope of a display data choice being sent to the media display unit(s), (indirectly)).

Example(s) shown/provided show a vehicle media display unit system, comprising: an electronic visual media display unit 12, for displaying media on an outside of a vehicle 14; and an attachment apparatus. (According to this aspect, the attachment apparatus is not limited to comprising an adhesive arrangement, and may use any attachment feature(s), for attachment, (eg screw(s), and/or bracket(s), and/or adhesive arrangement(s), and/or any other feature(s) for attachment, for example, not limited to the aforementioned examples). (According to this aspect, the attachment apparatus may be any shape and/or size and/or design, etc, not limited to the examples shown/provided).

(It should be stated, whilst image(s) that may seem static (or basic) in nature are shown being displayed by the visual media display unit in the example of FIG. 4, for example, it will be apparent that moving images (and far more complex images/imagery may be shown). For example, just as how a television (or computer, for example) can display moving images/imagery, so the visual media display unit may display such things. Thus movie files, for example, may be used, (eg MP4, MOV, etc), rather than just image files, (such as PNG, JPG, GIF, etc). Animations can also be displayed by the visual media display unit. Thus various options are possible, and the visual media display unit is not at all limited to displaying static display data. (It will be apparent that, for advertising, animation and moving imagery (such as what is shown as standard on televisions, for example) if often of more benefit (and more effective) that simply static imagery. Thus static, animation, video, etc can be displayed. Thus various options are possible, in terms of what is displayed by the visual media display unit.

Note: Referring to the media display unit(s) (and/or relevant any device(s)/element(s) shown, (eg the or any display data receiver)), one or more (or all) are preferably powered via a cigarette lighter of the vehicle. (This may be achieved via an adaptor/converter. An example input point 31 is shown for the example display data receiver in FIG. 3. The adaptor/convert can be inputted here, for example, to power the display data receiver. (This may also partially or wholly power the (or any) media display unit(s)). (This may be facilitated via a wiring arrangement between the example display data receiver and the (or any) media display unit(s), for example). Thus an adaptor/converter can go into the cigarette lighter, and then connect/be inputted into the display data receiver. (It should also be stated, it is feasible the/an adaptor/converter may be able to be connected/inputted directly into the (or any) media display unit(s), (ie not via the or any display data receiver, for example). This may require a protecting arrangement, etc, (as alluded to in the present application, at various points). (It will be apparent that such an adaptor/converter tends to comprise a wiring arrangement, etc)).

It should also be stated, rather than this, (ie powering solution), the media display unit(s) (and/or relevant any device(s)/element(s) shown, (eg the or any display data receiver), may have their own power source(s). The power source(s) may, for example, comprise a battery(s). (The or any battery(s) may be rechargeable). Other possible power source(s) include, for example, solar power, (and it will be apparent that various power source(s) are possible, in no way limited to the examples provided).

There is also shown an example USB input point 33, in the example of FIG. 3. This is shown by way of example only. Thus it is shown that the (or any) display data receiver may comprise various electronic input point(s). (Similarly, so it should be said that the (or any) media display unit(s) may comprise various electronic input point(s).

The embodiments shown, (in the drawings), are examples of wherein a portion or a whole of an underside of the containing arrangement is adhesive, (and a portion or a whole of an underside of the portion of the attachment apparatus that goes outside a portion or a whole of the perimeter of the media display unit is adhesive). (As stated, there may be provided covering element(s) that cover the portion or the whole of the underside that is adhesive. (These can preferably be peeled' off, as alluded to in FIG. 5).

According to another aspect of what is invented, there is provided: an apparatus, comprising: a containing arrangement that goes over a portion or a whole of an electronic media display unit; and an adhesive arrangement, to facilitate adhering the apparatus to an outside of the vehicle, wherein a portion or a whole of the adhesive arrangement adheres to the outside of the vehicle, outside a portion or a whole of a perimeter of the electronic media display unit, to facilitate adhering the apparatus to the outside of the vehicle. It will be apparent that various embodiments are shown of this, in the drawings, for example. Thus, according to this aspect, the apparatus may, or may not, play a primary role, (or any role at all), in attachment of the media display unit to the vehicle. (For example, different attachment means/method/feature(s) may be provided, to attach the media display unit(s) to the vehicle. (For example, it may be stuck on, or attached in any way—eg even by a way that penetrates the vehicle).

The apparatus, (not limited to being an 'attachment apparatus'), may then be used, (eg similar/same to as shown in the drawings), but may play little (or even no) role, in attaching the media display unit(s) to the vehicle. Nevertheless, it may nevertheless be extremely useful and/or important, (eg for waterproofing, for example). It may also generally protect a portion (or may preferably a whole) of the perimeter of the (or any) the media display unit(s), (eg from the elements (ie environment), and/or impact(s), and/or dirt, etc. Thus it may nevertheless be extremely useful and/or important.

It should be stated, the apparatus, (not limited to being an 'attachment apparatus'), gets all the benefit of all the disclosure/feature(s) disclosed, in the present application, in relation to the attachment apparatus 10, (but not limited to being 'an attachment apparatus' (for attaching the (or any) media display units to a vehicle)). Thus it may comprise any of the feature(s)/disclosure, relating to adhesiveness, for example, (afforded to the attachment apparatus in the present application). Thus it is here stated that the apparatus, (not limited to being an 'attachment apparatus'), according to this aspect, may be afforded any of the feature(s)/disclosure afforded to the attachment apparatus, (and this has herein been stated here, clearly). It will be apparent, in light of the disclosure of the present application, that such an apparatus may be extremely useful and/or important, for various reason(s).

Note: In the present application, the term 'containing arrangement' is used regularly. It will be apparent that the examples shown, (and many described), are examples of wherein there is a 'containing portion' (that goes over a portion or a whole of the electronic media display unit), and a surrounding portion (outside of a portion or a whole of a perimeter of the media display unit). Thus these terms may be used, in defining various embodiments. Similarly, broad terms such as 'a portion that goes over a portion or a whole of the media display unit' and 'a portion that goes/is outside of a portion or a whole of a perimeter of the media display unit' may be used. These terms are supported by the specification. (Similarly, the simple term 'adhesive' may be used, (instead of 'adhesive arrangement', (and is supported by the term 'adhesive arrangement'). (Thus there are disclosed/provided, in the present application, embodiments of an apparatus, comprising: a portion that goes over a portion or a whole of the media display unit, (in use); and a portion that goes outside of a portion or a whole of a perimeter of the media display unit, (in use); wherein a portion or a whole of an underside of the portion that goes outside of the portion or the whole of the perimeter of the media display unit is adhesive). (Embodiments are also disclosed, wherein a portion or a whole of an underside of the portion that goes over the portion or the whole of the media display unit is adhesive, (to facilitate adhering to the media display unit)).

Thus, there is provided, according to one aspect of what is invented, there is provided: an apparatus, (not limited to being an 'attachment apparatus'), comprising: a portion that goes over a portion or a whole of an electronic media display unit; and a portion that goes outside of a portion or a whole of a perimeter of the media display unit; wherein a portion or a whole of an underside of the portion that goes outside of the portion or the whole of the perimeter of the media display unit is adhesive, to facilitate adhering the apparatus to an outside of a vehicle. (A portion or a whole of an underside of the portion that goes over the portion or the whole of the media display unit may be adhesive, to facilitate adhering to the media display unit).

Thus, there is provided, according to one aspect of what is invented, there is provided: An attachment apparatus, for attaching an electronic media display unit to a vehicle, comprising: a portion that goes over a portion or a whole of the electronic media display unit; and a portion that goes outside of a portion or a whole of a perimeter of the media display unit; wherein a portion or a whole of an underside of the portion that goes outside of the portion or the whole of the perimeter of the media display unit is adhesive, to facilitate adhering the attachment apparatus, and thus attaching the electronic media display unit, to an outside of the vehicle. (A portion or a whole of an underside of the portion that goes over the portion or the whole of the media display unit is adhesive, to facilitate adhering to the media display unit).

(In FIG. 2, the dashed lines, in the example, represent where the perimeter of the example media display unit is. It can be seen, in the example, that the example apparatus comprises an example portion 52 that goes over a portion or a whole of the/an electronic media display unit. It can be seen, in the example, that the example apparatus comprises an example portion 54 that goes outside of a portion or a whole of a perimeter of the media display unit). (The same is the case for the example of FIG. 4, but the perimeter is not denoted in the example of FIG. 4). The examples are provided by way of example only, and it will be apparent that the portion that goes over a portion or a whole of the/an electronic media display unit, and the portion that goes outside of a portion or a whole of a perimeter of the media display unit may be provided in a wide range of sizes and/or shapes and/or designs, in no way limited to the embodiments provided. Thus various options and/or embodiments are possible).

(As alluded to earlier in the present application, various options and/or embodiments are possible, to facilitate adhesive attachment, (and this is the case for any portion(s) of the or any apparatus, (and any aspect(s) of what is invented). (Eg any of: an adhesive element(s) being added; glue; heat-treating; a 'separate' agent(s)/element(s) being used, (eg double-sided sticky element(s), etc). (This applies to any aspect(s) of what is invented). Thus various options and/or embodiments are possible).

The embodiments described above are provided by way of example only, and various other modifications will be apparent to persons skilled in the art without departing from the scope of the invention as defined in the appended claims.

Broader and/or Different Invention(s) May be Claimed (and are Supported)

The appended claims define limited inventions. However, it should be recognized and understood that the disclosure of the present application includes a vast array of inventions, not limited to inventions set out in the appended claims and/or any statement(s) of invention.

For example, if the present disclosure of the present application (inclusive of drawing(s) and/or description) discloses features a to z, it should be recognized and understood that any invention may be claimed, comprising any feature(s) out of features a to z. Thus if the appended claim 1 defines the invention claimed as comprising essential features a, b, and c, it should be understood that an invention may be claimed comprising solely feature a, or solely feature b, or solely feature c, or any combination of features a, b, and c. Furthermore, it should be understood that an invention may be claimed comprising any of feature(s) d to z, whether or not also comprising any of features a, b, or c.

Furthermore, no feature disclosed is limited to only being set forth in a claim when used in conjunction with other particular feature(s) it is disclosed with in the specification, but may be claimed with any other feature or combination of features disclosed in the present application. Thus if a feature is disclosed 'clustered' with several other feature(s) when disclosed in the specification, the applicant(s) nevertheless reserves the right to 'extract' that feature(s) from the several other feature(s) it is disclosed with, and set it forth in a claim, combined with any other feature(s) disclosed in the present application, which other feature(s) may, or may not, also be 'extracted' from any other feature(s) they are clustered with in the disclosure of the present application. Thus any permutation/combination of features may be claimed for patent in a future claim and/or patent application.

A final claim is (or may be) appended which serves to signify that I reserve the right to claim any invention (ie 'thing'), comprising any feature, or combination of features, disclosed in the present application (inclusive of drawing(s) and/or description). This statement (and/or final appended claim), if so desired, should be seen as a statement of invention, stating any invention (ie 'thing'), comprising any feature, or combination of features disclosed in the present application (in any permutation/combination). The applicant(s) reserves the right to claim any (such) invention (ie 'thing'), and considers an objection by a patent office/examiner (stating that such an invention is not supported by/disclosed in the present application) to be in direct conflict with this statement of invention. Thank you to the relevant patent office/examiner for taking note of this. It is intended (or plausible) that such invention(s) may be claimed in a future application(s) which claims benefit of priority of the present application, or, for example, in future filed claims of the present application. The present disclosure of the present application supports such invention(s)/claim(s).

Adjectival and Adverbial Use, in the Present Application, is Innately Optional

In the present application, adjectival definition of a noun/feature in no way limits the ability to claim the noun/feature, without the adjective. Thus if a 'curved edge' is disclosed, it should be understood that it is disclosed simply by way of example, as an embodiment of 'an edge', and that an invention may be claimed, comprising an 'edge', and not limited to comprising a 'curved edge', even if the only disclosure in the specification is of a 'curved edge'. This goes for every single adjective example in the present application, and also applies to adverbs in the same way, with reference to how they limit a broader verb/action, which verb/action/characterizing feature may be included in a claim (and is supported), not limited by the adverb that further defines it. This also applies to 'usage for' definitions. Thus if an instrument/apparatus, for example, is described, with reference to use for a particular thing (eg a 'pet cleaning apparatus', (which is therefore a cleaning apparatus, for use on pets)), then a 'cleaning apparatus' may be claimed, not limited to being a 'pet' cleaning apparatus and/or not limited to being for use on pets, even if all disclosure in the patent application relates to a 'pet cleaning apparatus'.

The Title of the Present Application does not Limit What May be Claimed

The title of the present application (and the claims presented) do not limit what may be claimed futurely, based upon (and supported by) the present application. For example, if the title is 'Pet Cleaning Apparatus', even if all disclosure in the patent application relates to a pet cleaning apparatus (as do the claims), nevertheless, a 'cleaning apparatus' may be claimed (not limited to being for pets), as it is clear a 'pet cleaning apparatus' is an embodiment of a 'cleaning apparatus'. As stated previously, in the present application, adjectival definition of a noun in no way limits the ability to claim the noun, without the adjective. This also applies to the title. Furthermore, an invention may be claimed comprising any feature, or combination of features, disclosed in the present application.

Any Feature Disclosed May be More Broadly Defined/Claimed as a Feature/Arrangement Any feature (for/with a given purpose) disclosed in the present application, whatever it is disclosed or defined as, may be more broadly defined in a claim as a feature (or arrangement) for the given purpose. Thus, if, for example, in the present application, a 'pin' is disclosed, for holding element 'a' and element 'b' together, such disclosure supports definition in a claim (in this, or a future patent application that claims benefit of priority to the present patent application) of a 'holding feature' (or 'holding arrangement'), for holding element 'a' and element 'b' together. This is the case for all feature(s)/disclosure, even including feature(s) defined in any statement(s) of invention and/or title of the invention.

Feature(s) Shown in the Drawings May be Combined to Form an Invention

Any feature(s) or combination of feature(s) shown in any drawing(s) may be combined with any other feature(s) or combination of feature(s) shown in any other drawing(s), to form an invention, which may be claimed. This may be the case for any embodiment shown in any drawing(s), and applicant(s) reserves the right to claim any such invention(s). Furthermore, such feature(s) may, of course, be combined with any other feature(s) and/or disclosure of the present application, to form an invention(s), which may be claimed. Such an invention(s) may be claimed in a future application(s) which claims benefit of priority of the present application, or, for example, in future filed claims of the present application. The present disclosure of the present application supports such invention(s)/claim(s).

The invention claimed is:

1. A vehicle media display unit system for displaying media on a vehicle, vehicle media display unit system comprising:
   an electronic media display unit for displaying the media;
   an attachment apparatus for mounting the electronic media display unit onto an outside of the vehicle, so that the media is displayed on the outside of the vehicle; and
   a display data receiver that is adapted to be located internally within the vehicle, separate from the electronic media display unit, the display data receiver functioning to receive the media, and to transfer the media to the electronic media display unit via a wiring arrangement that is adapted to travel through a door perimeter of the vehicle.

\* \* \* \* \*